(12) United States Patent
Yoder

(10) Patent No.: US 9,297,477 B2
(45) Date of Patent: Mar. 29, 2016

(54) VALVE HANDLE LOCK

(71) Applicant: NIBCO Inc., Elkhart, IN (US)

(72) Inventor: Keith W. Yoder, Goshen, IN (US)

(73) Assignee: NIBCO Inc., Elkhart, IN (US)

( * ) Notice: Subject to any disclaimer, the term of this patent is extended or adjusted under 35 U.S.C. 154(b) by 12 days.

(21) Appl. No.: 14/505,761

(22) Filed: Oct. 3, 2014

(65) Prior Publication Data

US 2015/0101684 A1 Apr. 16, 2015

Related U.S. Application Data

(60) Provisional application No. 61/891,615, filed on Oct. 16, 2013.

(51) Int. Cl.
*F16K 35/00* (2006.01)
*F16K 35/10* (2006.01)
*F16K 35/06* (2006.01)
*F16K 5/06* (2006.01)

(52) U.S. Cl.
CPC . *F16K 35/10* (2013.01); *F16K 5/06* (2013.01); *F16K 35/06* (2013.01); *Y10T 137/7256* (2015.04)

(58) Field of Classification Search
CPC ............................ Y10T 137/7256; F16K 35/10
USPC ............................ 251/90, 92, 93, 98, 110, 112
See application file for complete search history.

(56) References Cited

U.S. PATENT DOCUMENTS

| 195,611 A | 9/1877 | Jarecki |
| 1,139,208 A | 5/1915 | McMurray |
| 1,437,369 A | 11/1922 | Tallman |
| 3,648,970 A | 3/1972 | Hartmann et al. |
| 3,679,170 A | 7/1972 | Bernas et al. |
| 4,126,023 A * | 11/1978 | Smith ...................... F16K 35/06 137/385 |
| 4,208,033 A | 6/1980 | Kesterman |
| 4,756,507 A | 7/1988 | McAndrew |
| D297,354 S | 8/1988 | Wirth |
| 4,770,388 A * | 9/1988 | Carman ................ F16K 5/0647 251/104 |

(Continued)

FOREIGN PATENT DOCUMENTS

| CN | 101709791 | 5/2010 |
| CN | 201487368 | 5/2010 |

(Continued)

OTHER PUBLICATIONS

One page of photographs of Applicant's prior valve with locking handle.

*Primary Examiner* — R. K. Arundale
(74) *Attorney, Agent, or Firm* — Price Heneveld LLP

(57) ABSTRACT

A locking collar slideably fits over the control handle of a valve, such as a ball valve, and can be moved to locking and unlocking positions. The collar includes a pair of fork-like tines which are spaced apart to span a stop member on the valve body. One of the tines includes a tab with a threaded aperture for receiving a threaded adjustment screw. When tightened against the stop member, the screw secures the locking collar and, therefore, the valve handle in a fixed position, preventing inadvertent changing of the valve position. An aperture in the handle allows a lock to be inserted through the handle preventing movement of the locking collar to prevent changing of the valve position by unauthorized tampering.

19 Claims, 9 Drawing Sheets

(56) References Cited

U.S. PATENT DOCUMENTS

| | | | | |
|---|---|---|---|---|
| 5,014,528 A | * | 5/1991 | Roberts | F16K 35/06 137/385 |
| 5,139,041 A | | 8/1992 | Albrecht | |
| 5,165,263 A | | 11/1992 | Perron et al. | |
| 5,183,073 A | * | 2/1993 | Roberts | F16K 5/0647 137/385 |
| 5,213,308 A | | 5/1993 | Jeromson et al. | |
| 5,236,006 A | | 8/1993 | Platusich et al. | |
| 5,365,759 A | * | 11/1994 | Bonomi | F16K 35/06 137/385 |
| D358,455 S | | 5/1995 | Kieper | |
| 5,427,135 A | | 6/1995 | Kieper | |
| 5,709,112 A | * | 1/1998 | Kennedy | F16K 35/025 137/385 |
| 5,785,074 A | | 7/1998 | Kieper | |
| 6,119,494 A | * | 9/2000 | Whitfield | F16K 31/602 137/385 |
| 7,044,148 B2 | | 5/2006 | Berger et al. | |
| 8,205,859 B2 | | 6/2012 | Teague, Jr. | |
| 2005/0092367 A1 | * | 5/2005 | Espinoza | F16K 35/06 137/383 |

FOREIGN PATENT DOCUMENTS

| | | |
|---|---|---|
| CN | 201763994 | 3/2011 |
| CN | 203223586 | 10/2013 |

* cited by examiner

VALVE HANDLE LOCK

CROSS-REFERENCE TO RELATED APPLICATIONS

This application claims priority under 35 U.S.C. §119(e) and the benefit of U.S. Provisional Application No. 61/891,615 entitled VALVE HANDLE LOCK, filed on Oct. 16, 2013, by Keith W. Yoder, the entire disclosure of which is incorporated herein by reference.

BACKGROUND OF THE INVENTION

The present invention relates to a securing and locking apparatus associated with the control handle for a valve.

Valves, and especially ball valves, typically have stops for controlling the handle between fully opened and fully closed positions while still allowing intermediate positions if desired. In most applications, a valve is left in one of a fully opened or a fully closed position. In most installations, it is undesirable to inadvertently change the selected fully open or fully closed position. Prevention of inadvertent movement of a valve can be accomplished in a number of ways, including, for example, valve locks, such as disclosed in U.S. Pat. Nos. 5,427,135, 5,785,074, and D 358,455, in which locking rings or tabs are positioned to engage a valve handle and include apertures which permit locks to be inserted between the locking member and the handle to also prevent tampering with a valve when in a selected position. Although these locking mechanisms allow the valves to be secured from tampering, it would be desirable to have an apparatus that provides both padlocked security but also an intermediate secured position which does not require a padlock but still prevents inadvertent movement of the valve, such as by inadvertent contact with the valve control handle.

SUMMARY OF THE INVENTION

The present invention provides a relatively inexpensive locking collar which slideably fits over the control handle of a valve, such as a ball valve, and can be moved to locking and unlocking positions. The collar includes a pair of spaced-apart tines which are spaced apart sufficiently to span a stop member on the valve body. One of the tines includes a tab extending outwardly and having a threaded aperture for receiving a threaded fastener. When tightened, the fastener engages the stop member and secures the locking collar from movement, and, therefore, the valve handle remains in a fixed selected position, preventing inadvertent changing of the valve position. The collar, when in a locked position, is adjacent an aperture in the handle, such that a lock can be inserted through the handle preventing movement of the locking collar and valve from one position to another without removing the lock.

The locking collar can be stamp-formed and slideably secured to the handle during manufacture of the handle or subsequently added to the handle. By providing an adjustment fastener which selectively locks the valve in one position or another without requiring a separate padlock, the valve has two levels of security. One level prevents inadvertent changing of the valve position unless the adjustment fastener or screw is loosened while the second level allows the use of a padlock to prevent movement of the valve by unauthorized tampering.

These and other features, objects and advantages of the present invention will become apparent upon reading the following description thereof together with reference to the accompanying drawings.

DETAILED DESCRIPTION OF THE PREFERRED EMBODIMENT

Figure 1:
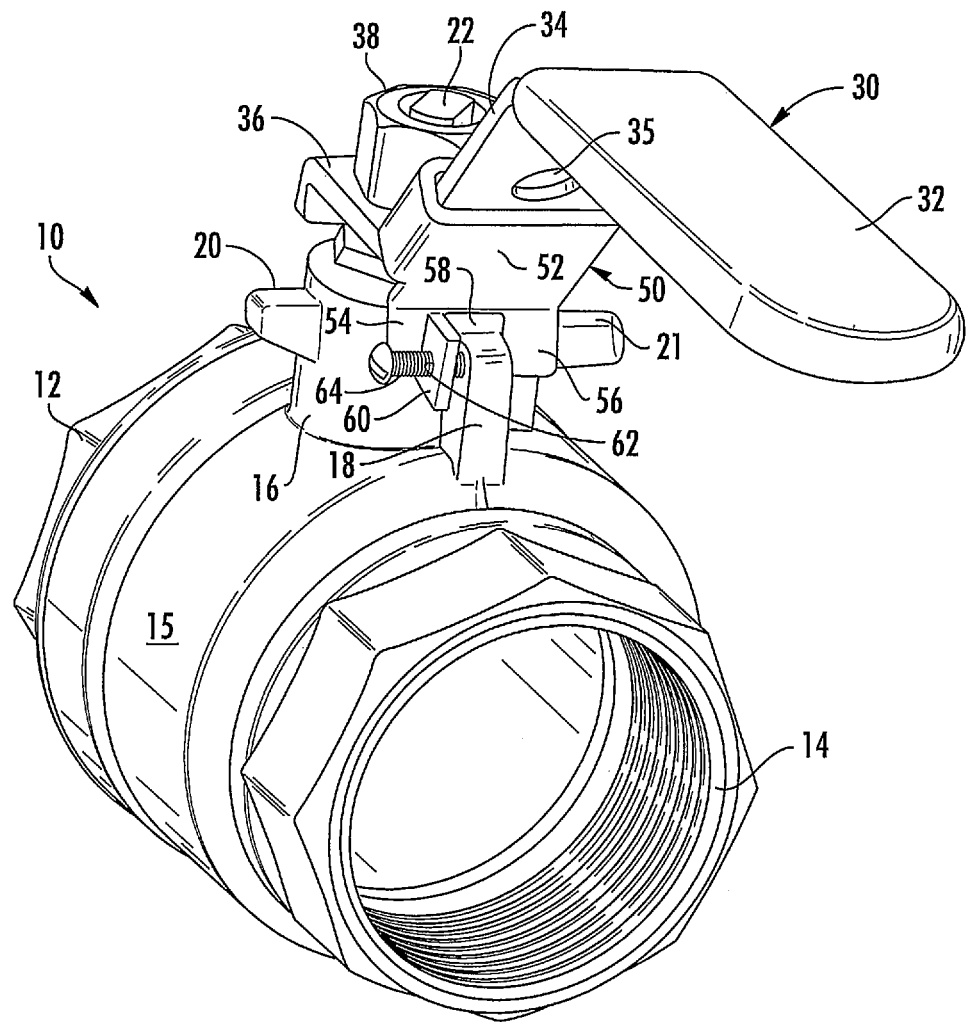
FIG. 1 is a front left perspective view of a ball valve embodying the present invention, shown in a first secured open position.
Figure 2:
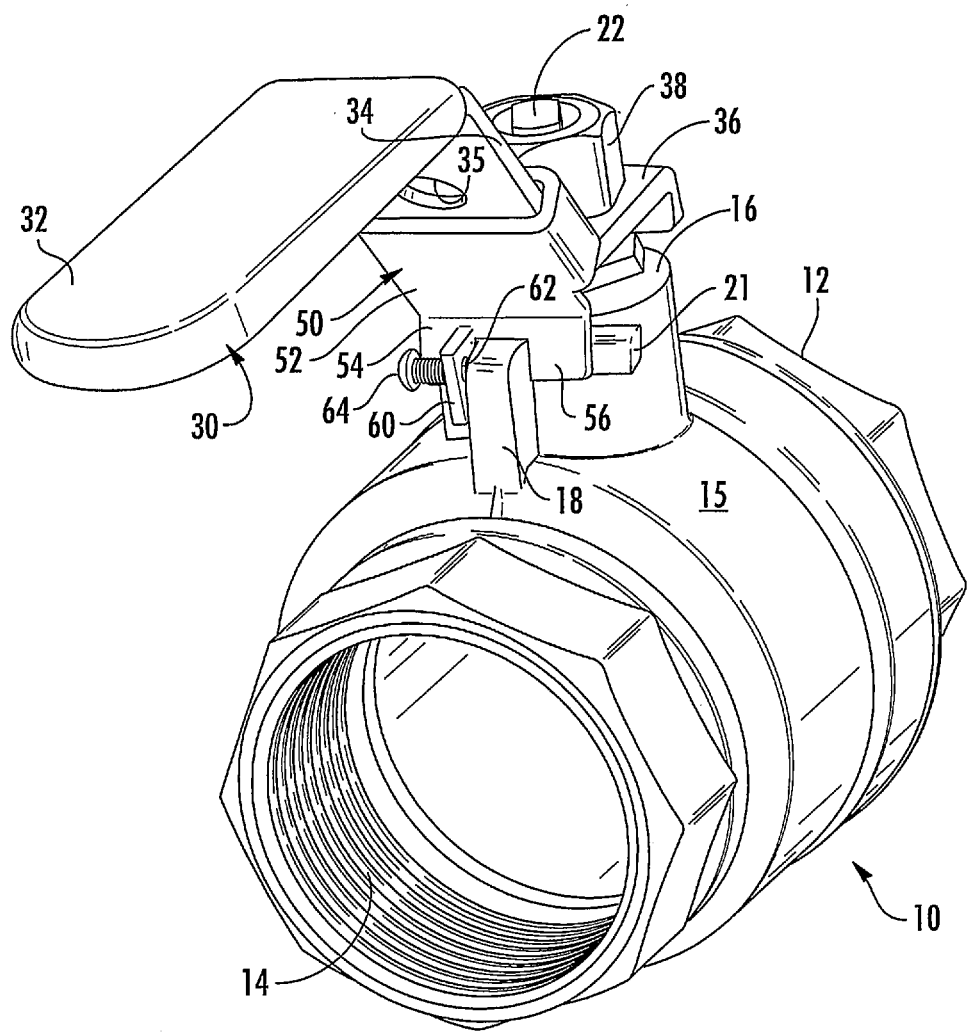
FIG. 2 is a front right perspective view of the valve shown in FIG. 1, showing the opposite side of the securing mechanism.
Figure 3:
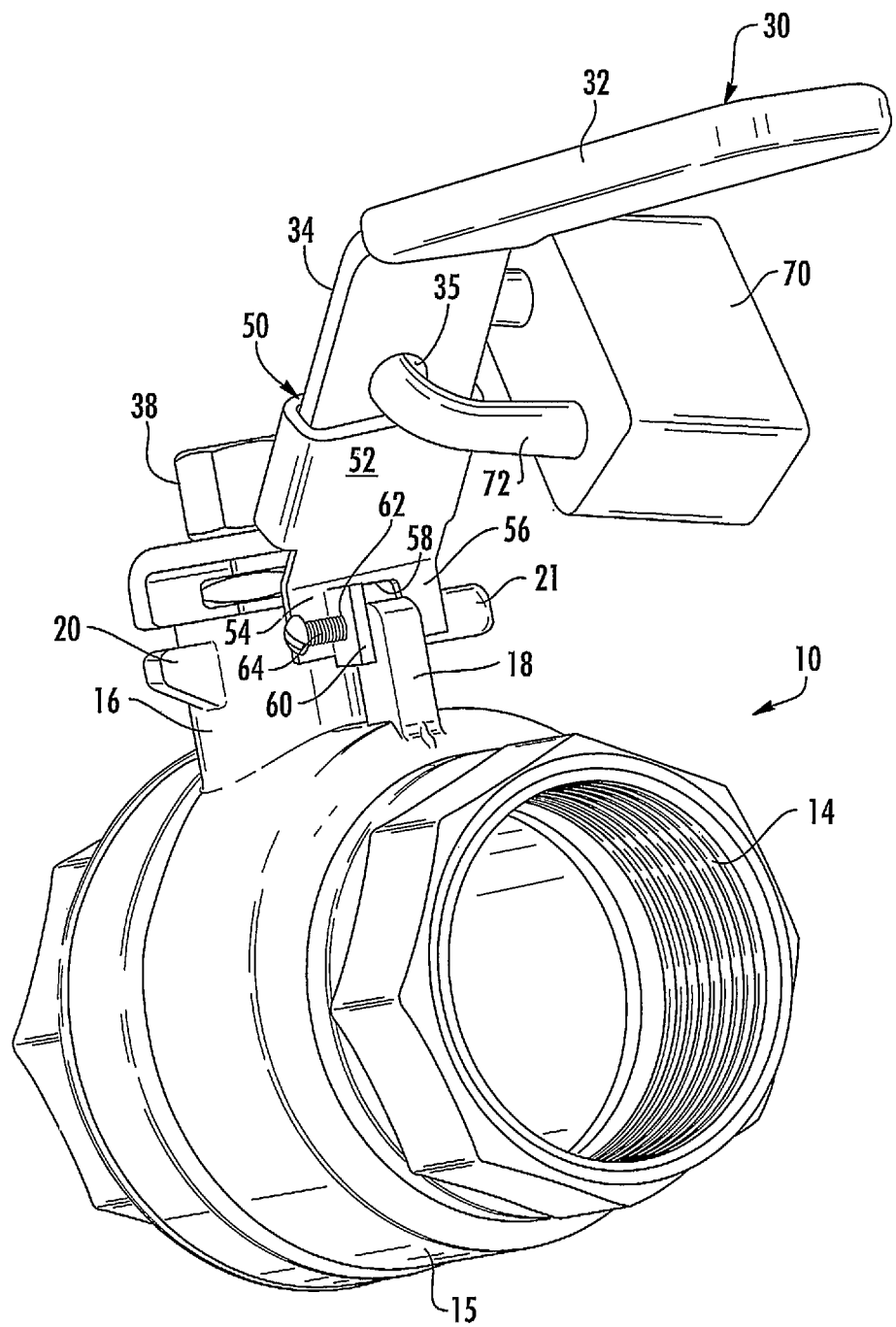
FIG. 3 is a lower front perspective view of the valve shown in FIGS. 1 and 2, shown with a padlock locking the valve in the open position to prevent tampering.
Figure 4:
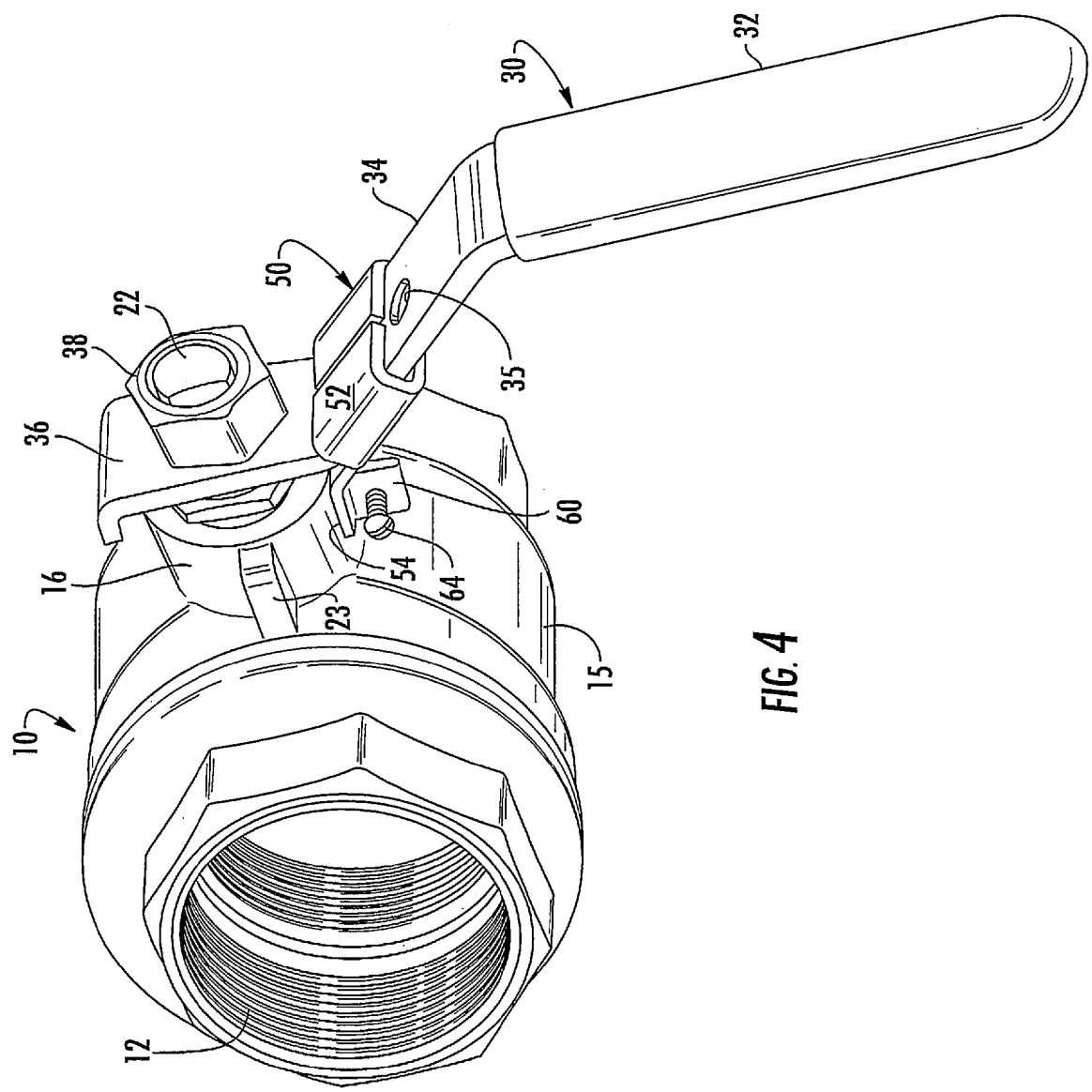
FIG. 4 is an upper perspective view of the valve shown in FIGS. 1 and 2, shown from the opposite end and showing the valve in a secured closed position.
Figure 7:
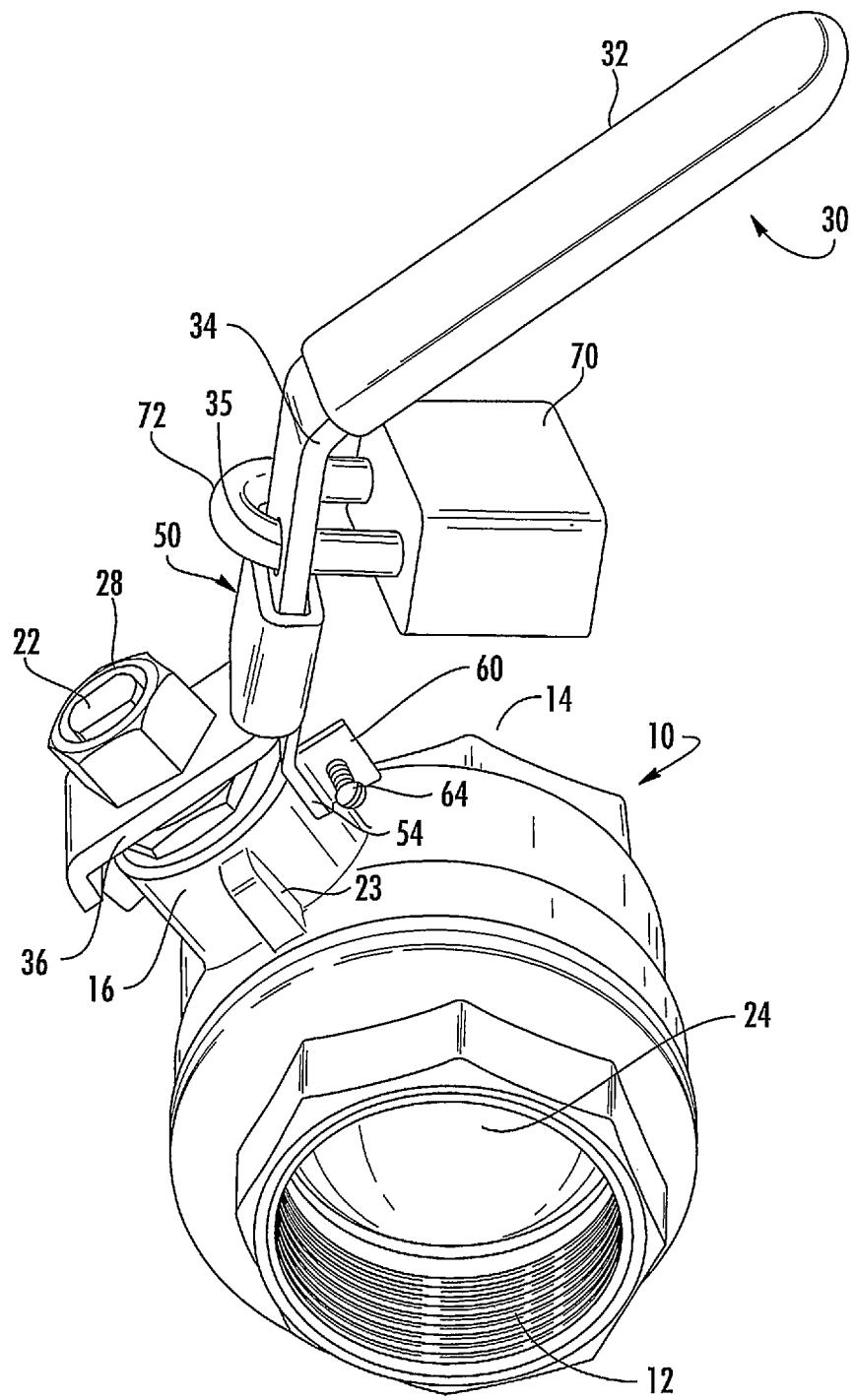
FIG. 7 is a left-side perspective view of the valve shown in FIG. 4, shown with a padlock inserted locking the valve in a closed position and securing it against tampering.

Referring initially to FIGS. 1-3, there is shown a ball valve 10 of conventional construction, including a valve body 15 having an internally threaded inlet 12 and an internally threaded outlet 14 for securing threaded conduits (not shown) to the valve. The valve body 15 includes a valve stem housing 16 which conventionally includes a radially outwardly extending stop 18 for the open position of the valve and, at 90° from stop 18, a second stop 20 corresponding to the closed position of the valve. A valve stem 22 rotatably and sealably extends through housing 16 and is coupled to a ball 24 in the body of the valve (FIG. 7). A lever-type valve control handle 30 is coupled to the valve stem 22 through a conventional keyed connection. Thus, the end 36 of the handle includes a generally rectangular aperture, which engages the threaded rectangular end of valve stem 22 in a locking engagement and is secured thereto by means of a nut 38 threaded onto the top threaded end of the valve stem 22. This construction of the valve itself is conventional for typical ball valves, such as manufactured and commercially available from the Applicant, NIBCO Inc. of Elkhart, Ind.

Figure 6:
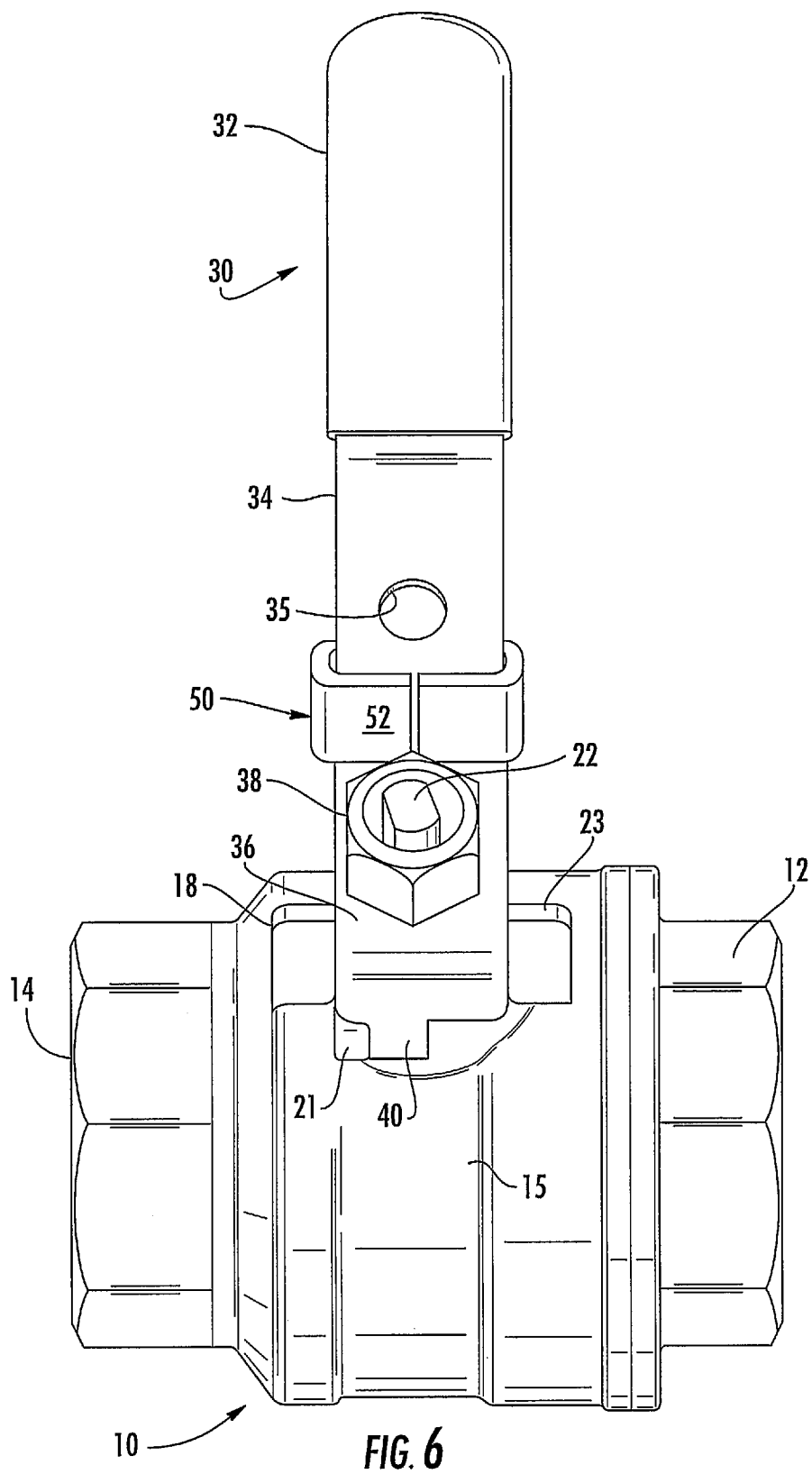
FIG. 6 is a top elevational view of the valve shown in FIG. 4.

The handle 30 includes a first end 32, typically coated with a polymeric material, an intermediate downwardly inclined section 34, and a valve stem engaging end 36. End 36 includes a downwardly depending tab 40 (best seen in FIG. 6) which engages a stop 21 on the valve stem housing 16 when the valve is in a closed position (FIG. 6) and engages stop 23 when the valve is in an open position (as can be visualized in FIG. 9). In addition to the orthogonally oriented 90° spaced stops 21 and 23 on the valve body 15, the valve stem housing 16 integrally includes a second pair of 90° spaced stops 18 and 20 for engagement by a locking collar 50 of the present invention. Handle section 34 includes an aperture 35 located between the locking collar 50 and handle section 32 for securing a padlock 70 to the handle, as illustrated in FIGS. 3 and 7, when it is desired to lock the position of the valves in open or closed positions, respectively. The bail 72 of the padlock 70 holds the collar 50 in a locking position which prevents tampering with the valve by preventing movement of the handle 30 and the selected position of the locked valve 10.

Figure 5:
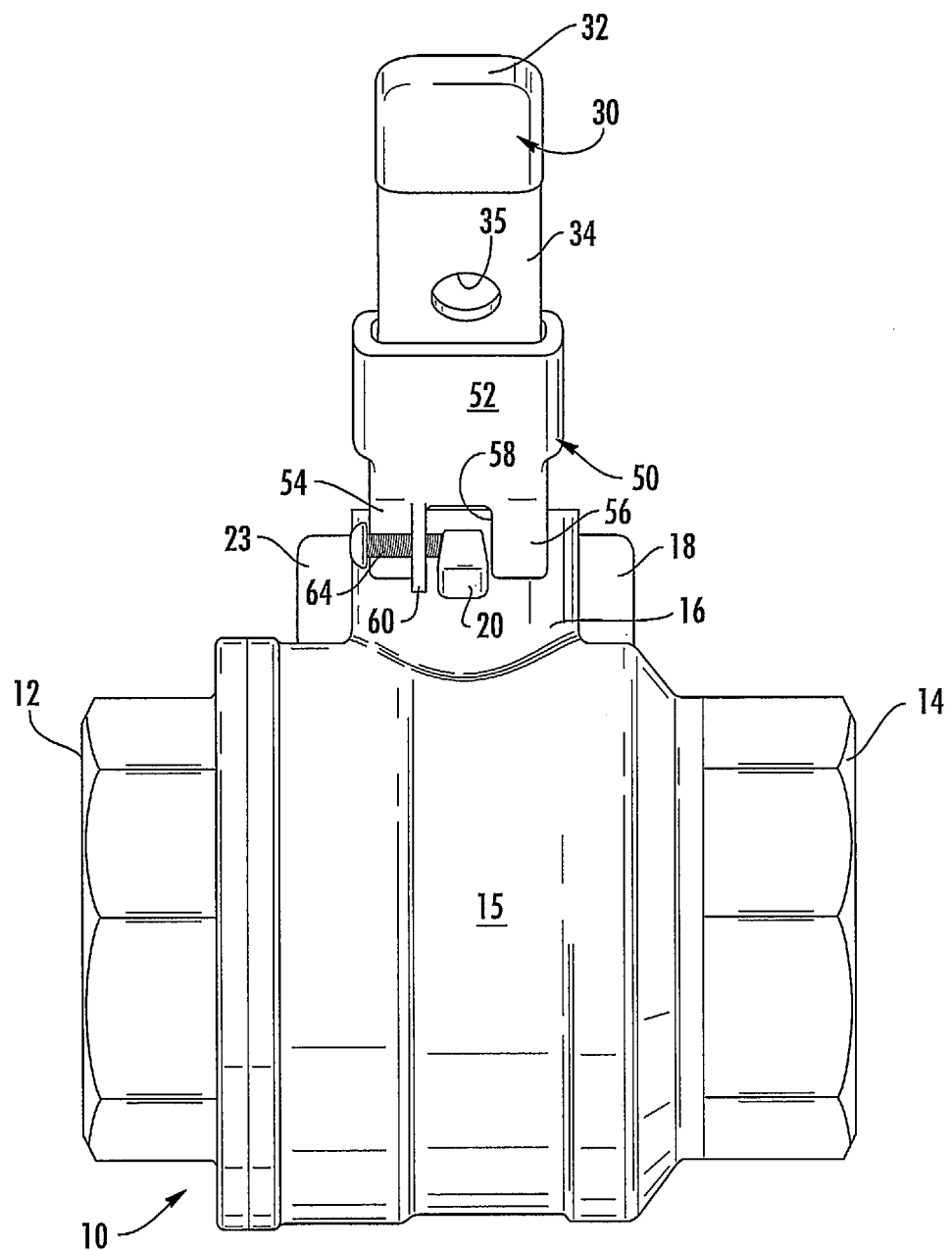
FIG. 5 is a bottom elevational view of the valve shown in FIG. 4.
Figure 8:
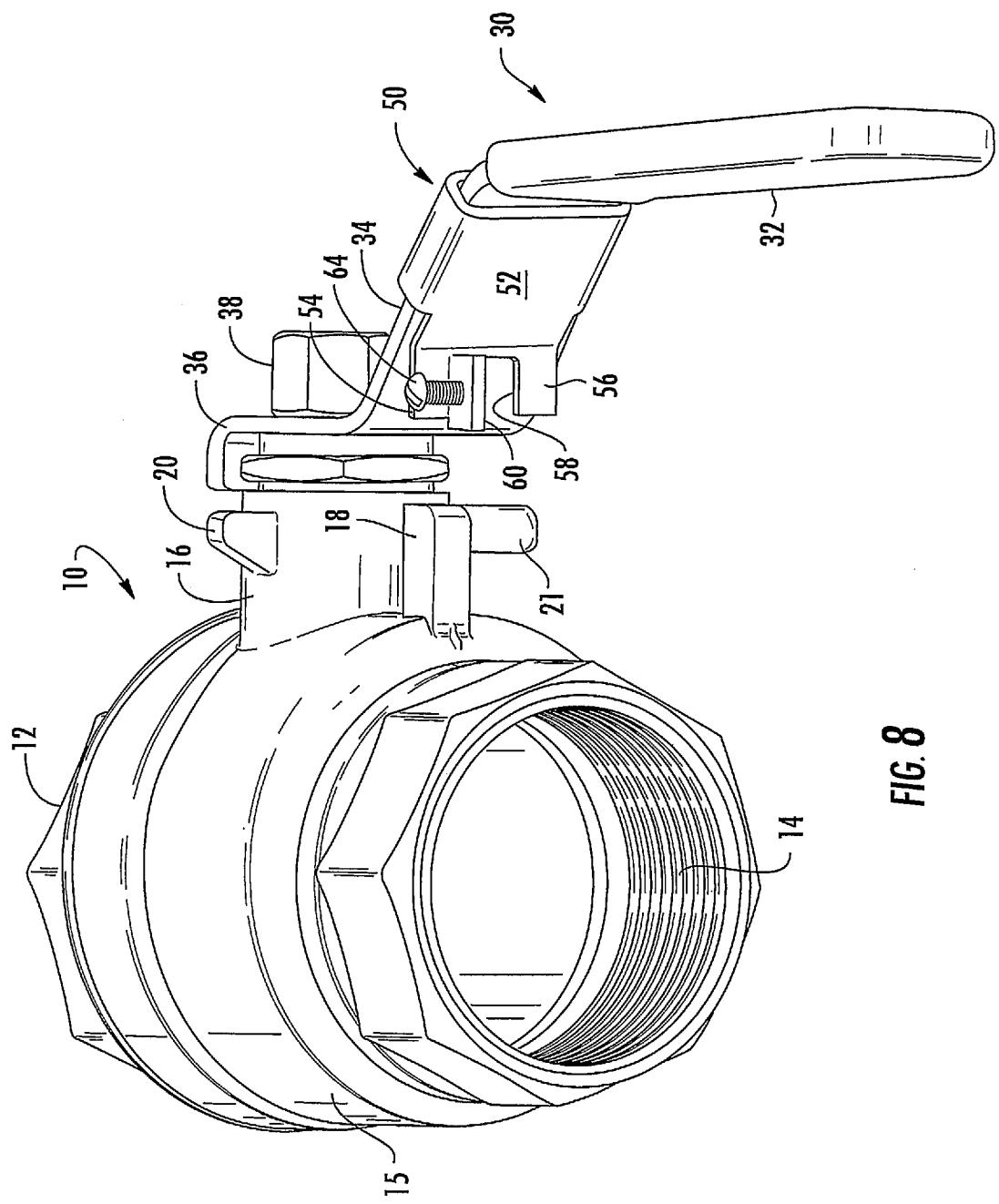
FIG. 8 is a front perspective view of the valve shown in FIG. 1 rotated 90° from FIG. 1 and shown with the locking collar slideably moved to a disengaged position with respect to a stop on the valve stem housing.
Figure 9:
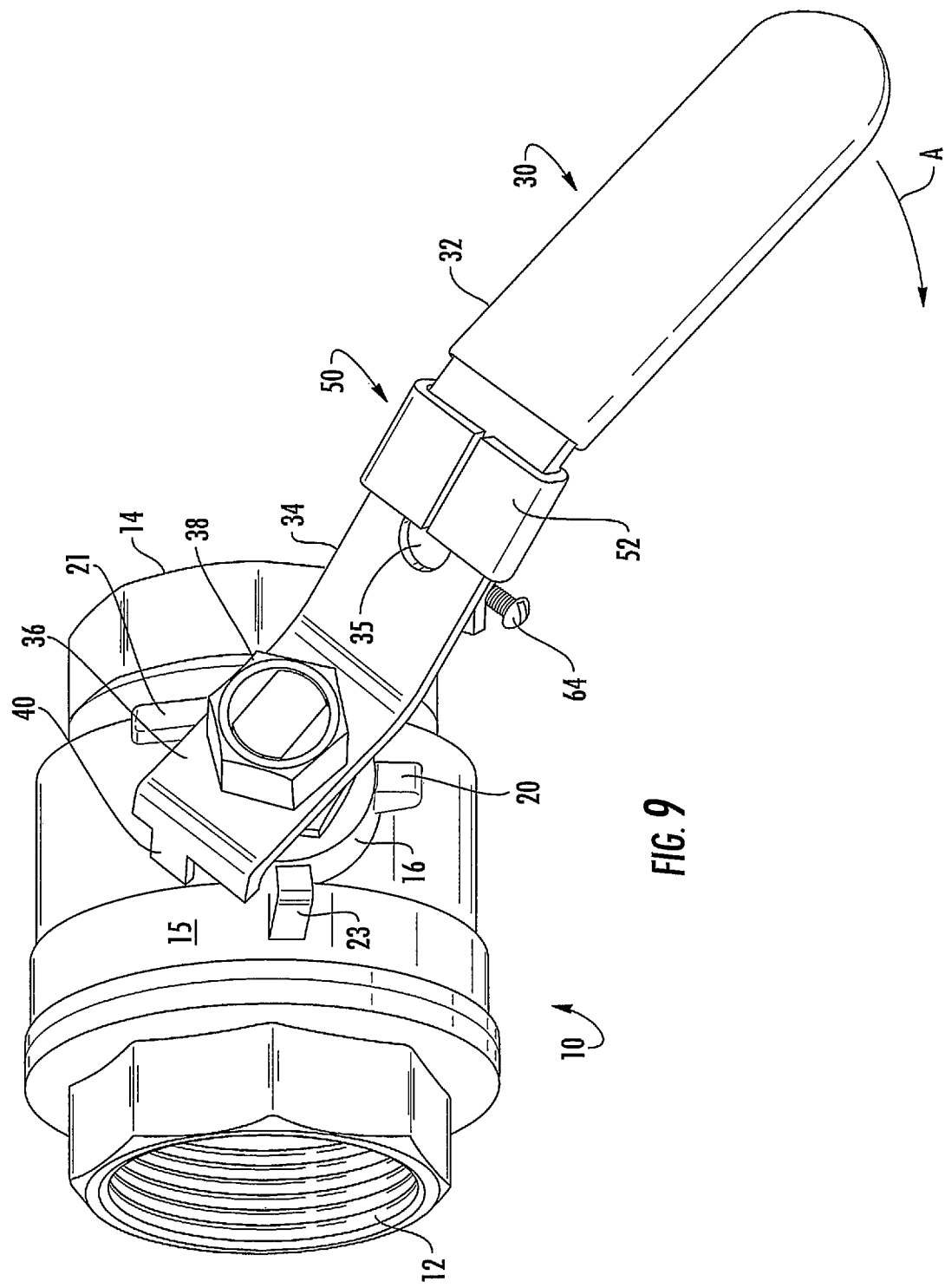
FIG. 9 is a right-side view of the valve shown in FIG. 8, shown with the control handle moving in the direction of arrow A to a partially valve closed position and with the locking collar in a disengaged position.

The locking collar 50 of the present invention includes a generally rectangular central body 52 which surrounds rectangular section 34 of handle 30 and is loosely secured thereto, such that it can slide between a secured or locked position (shown in FIGS. 1-7) or to an unlocked and movable position, as illustrated in FIGS. 8 and 9. The locking collar 50 integrally includes a pair of fork-like downwardly depending spaced-apart tines 54 and 56 defining an open slot 58 which is dimensioned to allow tines 54 and 56 to span and fit over stop 18 (FIGS. 1 and 2) or stop 20 (FIGS. 5 and 6) when in a securing position, or locking position (shown in FIGS. 3 and 7). Additionally, the collar 50 includes an orthogonally outwardly extending tab 60, coupled to one of the tines 54 or 56 (54 shown), and which includes a threaded aperture 62 for receiving a locking fastener 64, such as a screw. Depending upon the size of the valve, which can vary, the fastener can be a 6-32, an 8-32, or, in larger valves, a 10-24 threaded fastener. Typically, the materials used for the valve components are conventionally weather and/or chemical resistant to withstand the environment in which the valve is employed. The slot 58 between tines 54 and 56 of collar 50 is wider than the stops 18 and 20, and tab 60 extends from one edge of slot 58, as best seen in FIG. 1, to allow the fastening screw 64 to be tightened against the stop, such as stop 18 when the valve is in an open position, as seen in FIGS. 1 and 2, or stop 20, as seen in FIG. 5, when in a closed position. The length of the fastener is selected to allow its compression against stop 18 or 20. This secures the handle and, thus, the valve position in a selected position to prevent accidental movement. When fastener 64 is tightened against one of stops 18 or 20, the locking collar 50 cannot be slid away from the stops and, therefore, handle 30 cannot be inadvertently moved, thus providing a first level of security for the valve.

When, however, the valve is installed in a location where tampering must be prevented, a padlock, such as padlock 70, can have its bail 72 inserted through aperture 35 in handle section 34 to prevent the locking collar 50 from being moved from a locked position, regardless of the position of the fastener 64, to securely lock the valve in either an open position as illustrated in FIG. 3 or a closed position as illustrated in FIG. 7. Although the invention is shown in the environment of a ball valve, it should be understood that the securing/locking collar can be configured to be used with any type of valve having stops and a movable control handle. Typically, the materials used for the valve components are conventionally weather and/or chemical resistant to withstand the environment in which the valve is employed.

It will become apparent to those skilled in the art that various modifications to the preferred embodiment of the invention as described herein can be made without departing from the spirit or scope of the invention as defined by the appended claims.

The invention claimed is:

1. A locking collar for a control handle of a valve with a valve body having stops engaging the control handle at open and closed positions, said collar comprising:

a collar slideably mounted to the handle of the valve;

a pair of spaced-apart tines extending from said collar, said tines spaced apart to span a stop member on the valve body when said collar is moved to a position to engage the stop member; and a tab extending from at least one of said tines to align with a stop on the valve body, said tab having a threaded aperture for receiving a threaded adjustment fastener such that, when tightened against the stop member, the fastener secures the collar and valve handle in a fixed position preventing inadvertent changing of the valve position.

2. The locking collar as defined in claim 1 wherein a lock can be inserted through the handle, preventing movement of the collar from a locked position in which said tines engage the stop member.

3. The locking collar as defined in claim 2 wherein said tines of said collar extend toward the valve body.

4. The locking collar as defined in claim 3 wherein said tab extends in a direction away from the valve body.

5. The locking collar as defined in claim 4 wherein said collar is stamp-formed.

6. The locking collar as defined in claim 5 wherein said collar has a generally rectangular body section that slides over the handle of the valve.

7. The locking collar as defined in claim 5 wherein said fastener is a screw.

8. A locking collar and handle for controlling the position of a valve with a valve body and valve stem, the body having stops engaging said handle at open and closed positions comprising:

a handle engaging the valve stem for moving the valve between open, closed, and partially open positions;

a collar slideably mounted to the handle of the valve;

a pair of fork-like tines extending from said collar which are spaced apart to span stops on the valve body; and a tab extending from at least one of said tines to align with a stop on the valve body, said tab having a threaded aperture for receiving a threaded fastener such that, when said fastener is tightened against the stop, the fastener secures said collar and said handle in a fixed position preventing inadvertent changing of the valve position.

9. The locking collar and handle as defined in claim 8 and further including an aperture in said handle, such that a lock can be inserted through said handle, preventing movement of said collar from a locked position without removing the lock.

10. The locking collar and handle as defined in claim 9 wherein said collar is stamp-formed.

11. A valve assembly comprising:

a valve having a valve body and a valve stem, said assembly including a handle coupled to said valve stem for changing the state of said valve and wherein said valve body includes outwardly extending stops for engaging said handle at open and closed positions;

a collar slideably mounted to said handle of said valve;

a pair of fork-like tines extending from said collar which are spaced apart to span stops on said valve body; and a tab extending from at least one of said tines to align with a stop on said valve body, said tab having a threaded aperture for receiving a threaded fastener such that, when said fastener is tightened against said stop, said fastener secures said collar and said handle in a fixed position preventing inadvertent changing of the valve position.

12. The valve assembly as defined in claim 11 and further including an aperture in said handle, such that a lock can be inserted through said handle, preventing movement of said collar from a locked position without removing the lock.

13. The valve assembly as defined in claim 12 wherein said valve body has four stops extending outwardly therefrom and spaced from one another at 90° intervals.

14. The valve assembly as defined in claim 13 wherein said handle has a downwardly extending tab which engages two of said stops positioned at 180° intervals and wherein said tines of said collar selectively engage the remaining two stops.

15. The valve assembly as defined in claim 14 wherein said valve is a ball valve.

16. The valve assembly as defined in claim 15 wherein said collar is stamp-formed.

17. The valve assembly as defined in claim 11 wherein said collar selectively secures said handle in a first secured position or a second locked position.

18. The valve assembly as defined in claim 17 and further including an aperture in said handle, such that a lock can be inserted through said handle, preventing movement of said collar from a locked position without removing the lock.

19. The valve assembly as defined in claim 18 and further including a padlock for attachment to said valve handle.

* * * * *